United States Patent [19]

Schleupen

[11] 4,275,340
[45] Jun. 23, 1981

[54] CONTROL CIRCUIT FOR A FINAL CONTROL ELEMENT, IN PARTICULAR AN ELECTRIC MOTOR

[75] Inventor: Richard Schleupen, Ingersheim, Fed. Rep. of Germany

[73] Assignee: Robert Bosch GmbH, Stuttgart, Fed. Rep. of Germany

[21] Appl. No.: 76,123

[22] Filed: Sep. 17, 1979

[30] Foreign Application Priority Data

Oct. 6, 1978 [DE] Fed. Rep. of Germany ....... 2843622

[51] Int. Cl.$^3$ ............................................. H02P 1/22
[52] U.S. Cl. ................................... 318/280; 318/293; 318/256; 318/294; 307/254
[58] Field of Search ............... 318/280, 287, 290, 291, 318/293, 294, 257, 65, 256, 54; 307/254, 255

[56] References Cited

U.S. PATENT DOCUMENTS

| | | | |
|---|---|---|---|
| 3,110,851 | 11/1963 | Plogstedt et al. ................. | 318/257 X |
| 3,144,598 | 8/1964 | Merritt .............................. | 318/257 X |
| 3,427,520 | 2/1969 | Oppedahl ......................... | 318/294 X |
| 3,496,441 | 2/1970 | Heider et al. .................... | 318/294 X |
| 3,525,883 | 8/1970 | Iordanidis ........................ | 318/293 X |

*Primary Examiner*—Ulysses Weldon

*Attorney, Agent, or Firm*—Frishauf, Holtz, Goodman & Woodward

[57] ABSTRACT

In order to control the motion of a final control element, for example a servomotor used in the steering gear or the cruise control of a motor vehicle, and to provide for rapid dynamic braking of the servomotor by short-circuiting, the invention provides a bridge circuit consisting of four power transistors each of which is controlled by connection to one input transistor. The bases of pairs of input transistors are joined and receive control signals of equal or opposite values. The emitter of one transistor in each pair is joined to the emitter of another transistor in each pair and is then connected to respective supply lines of the circuit or to a source of an average supply voltage. The overall connection of the circuit is such that when differing signals are applied to the input contacts of the circuit, current flows through one diagonal branch of the bridge and through the servomotor in one direction, whereas, when different signals of opposite polarity are applied to the input contacts, current flows through the servomotor in the opposite direction. When signals of equal value are applied to the input contacts, the circuit provides a short-circuit path through the servomotor, permitting rapid deceleration.

4 Claims, 2 Drawing Figures

CONTROL CIRCUIT FOR A FINAL CONTROL ELEMENT, IN PARTICULAR AN ELECTRIC MOTOR

FIELD OF THE INVENTION

The invention relates to the control of electric servomotors, as well as providing for its dynamic braking.

BACKGROUND OF THE INVENTION AND STATE-OF-THE-ART

Control circuits for servomotors are known, see for example, German patent disclosure document DE-OS No. 2 350 958. That publication describes a control circuit including an electronic bridge circuit consisting of four semiconductor switches. The servo motor is connected as a lateral branch of the bridge while an input circuit determines the desired direction of rotation of the servomotor by rendering one or the other of the diagonally positioned branches of the bridge conducting. When the servo motor is to be stopped, all the semiconductor switches of the bridge circuit are blocked thereby making it impossible to perform a rapid electrical, i.e., dynamic, deceleration and stopping of the servomotor.

Another known system, described in the German disclosure document DE OS No. 2 640 792, describes a control system which shortcircuits the motor for the purpose of rapid deceleration. The short-circuiting is performed by a relay circuit because, as is stated in the publication, the expense of a purely electronic circuit would be too great.

OBJECTS AND SUMMARY OF THE INVENTION

It is thus a principal object of the present invention to provide a control circuit for a servomotor which is purely electronic, i.e., has no moving parts, and yet permits a shortcircuit braking of the servomotor and which is simple and inexpensive.

This is accomplished according to the invention by providing an electronic bridge circuit each branch of which includes two semiconductor switches in series. The transistors of each branch are controlled by a pair of input transistors so connected as to permit the flow of electrical current through the servomotor in either direction. Furthermore, the invention provides electronic circuit means, connected to the input transistors to permit short-circuiting the servomotor and thereby to permit the dynamic braking of the servomotor.

The control circuit has the advantage that it is purely electronic with relatively few discrete parts while permitting dynamic braking of the servomotor.

A particularly advantageous embodiment of the invention provides means for conducting away the emitter currents of the input transistors, for example via zener diodes or resistors.

THE DRAWING

FIG. 1 is a detailed circuit diagram of a first exemplary embodiment for a control circuit of a servomotor according to the invention; and FIG. 2 is a circuit diagram of a portion of a variant of the invention similar to FIG. 1.

DESCRIPTION OF THE PREFERRED EMBODIMENTS

Figure 1:
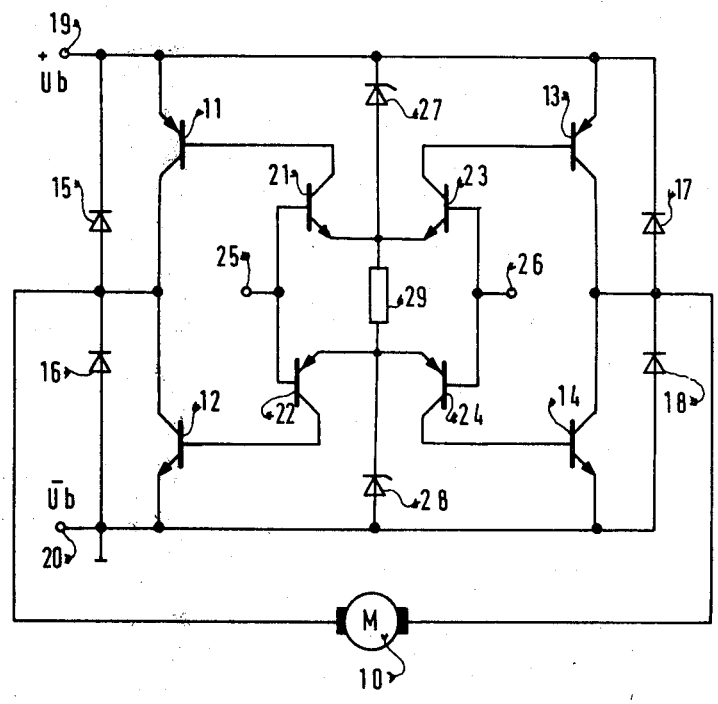

In the first embodiment of the invention illustrated in FIG. 1, a servomotor or other final control element 10 is connected in the transverse branch of an electronic bridge circuit consisting principally of four power transistors 11–14. The PNP transistor 11 and the NPN transistor 12 constitute the first longitudinal bridge circuit while the PNP transistor 13 and the NPN transistor 14 constitute the second longitudinal branch. Free-running diodes 15–18 are connected respectively in the opposite sense of conduction across the transistors 11–14. The emitters of the transistors 11,13 are connected to a positive voltage supply line terminal 19 while the emitters of the transistors 12, 14 are connected with an electrical terminal 20 which is grounded or is connected to the negative supply pole of the battery. The circuit of the invention further comprises an input circuit consisting of four input transistors 21–24. The base of each of the transistors 11–14 in the basic bridge circuit is connected to the collector of the respectively associated input transistor 21–24, the association being indicated by a numeral which is increased by 10 (ten) over the reference numeral of the power transistors 11–14. The base of each of the transistors 21,22 is connected to a common input terminal 25 while the base of each of the transistors 23, 24 is joined to a second input terminal 26. The input terminal 25 is associated with a first direction of motion or rotation of the servomotor 10 while the input terminal 26 is associated with the opposite direction of motion or rotation. The emitters of the NPN transistors 21, 23 are jointly connected via a zener diode 27 to the aforementioned positive terminal 19 while the emitters of the PNP transistors 22, 24 are connected via a zener diode 28 to the ground terminal 20. A low-valued resistor 29 is connected between the emitters of the transistors 21, 23 and the emitters of the transistors 22, 24. When the control system is in the neutral status, i.e., each of the input terminals 25, 26 receives a voltage of for example 0 volt, the input transistors 22, 24 are conducting, thereby rendering the power transistors 12, 14 conducting because the emitter current of the input transistors 22, 24 is able to flow to the contact 19 through the low-valued resistor 29 and the zener diode 27. All the other transistors 11, 13, 21 and 23 are blocked however. Accordingly, the servomotor 10 is shortcircuited via two different paths, firstly the conduction path of the transistor 12 and the diode 18 and secondly the conducting path of the transistor 14 and the diode 16. In order to move the servomotor in a first direction of displacement, a positive signal is applied to the terminal 25. This signal blocks the transistors 12, 22, thereby causing the transistors 11, 21 to conduct. A control current now flows from the terminal 19 through the transistor 11, the servomotor 10, and the transistor 14 to the negative terminal 20, i.e., the first diagonally placed bridge branches including transistors 11,14 are rendered conducting. In the opposite situation, i.e., when a positive voltage is applied to the terminal 26 while a voltage of approximately 0 volt is placed on the terminal 25, the opposite diagonally placed bridge branches including transistors 13,12 becomes conducting and the electric current flows through the servomotor 10 in the opposite direction, thereby causing it to be rotated or displaced in the opposite geometric sense. As already mentioned, if the same signal, for example 0 volt, is placed on both control input terminals 25, 26, the transistors 11, 13 are blocked while the transistors 12, 14 conduct. Accordingly, the servomotor 10 is short-circuited abruptly through the diode 18 or 16, depending on the direction of rotation, i.e., on the polarity of the EMF of the servomotor 10. This current flow causes the rapid deceleration of the moving servomotor. If positive signals are applied to both input terminals 25, 26 either by accident or because such signals represent the neutral position of a particular servo system, the transistors 12, 14 are blocked while the transistors 11, 13 become conducting which also short-circuits the servomotor 10 and causes its rapid deceleration. The conduction of the transistors 11, 13 depends on the conduction of the transistors 21,23 which is insured by the fact that the emitter currents can flow to ground through the resistor 29 and the zener diode 28.

Figure 2:
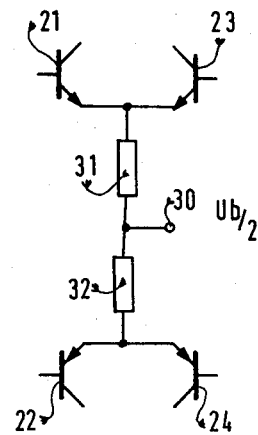

A second embodiment of the invention, illustrated partially in FIG. 2, shares all the elements of FIG. 1 even though not specifically shown in FIG. 2. However, in place of the elements 27–29 of FIG. 1, the embodiment of FIG. 2 includes two low-valued series-connected resistors 31, 32 the junction 30 of which receives one-half of the supply voltage, i.e., the voltage $U_b/2$. The resistor 31 is connected to the joined emitters of the transistors 21, 23 while the resistor 32 is connected to the joined emitters of the transistors 22, 24. The circuit of FIG. 2 permits the emitter currents of the transistors 21–24 to flow to the power source via the terminal 30 through the low-valued resistors 31, 32.

If it is not desired to short-circuit the servomotor 10 when a positive control voltage is applied to both input terminals 25, 26 then the zener diode 28 must be eliminated. Similarly, if a neutral servomotor position in which a 0 voltage signal is applied to both contacts 25, 26 is not intended, the zener diode 27 may be eliminated.

A control circuit for a servomotor according to the present invention is particularly suitable for use with cruise control systems of motor vehicles or steering control systems. In the first case, the servomotor might be, for example, a final control element actuating the fuel control pedal whereas in the second case, the servomotor would engage the steering gear of the vehicle.

The short-circuiting of the servomotor may also be achieved by the use of triacs as a substitute for the transistors and diodes described above.

I claim:

1. A control circuit for a servomotor (10) including a bridge circuit comprising positive and negative supply terminals (19, 20);
   four semiconductor elements (11, 12, 13, 14), respective pairs (11/12; 13/14) of said semiconductor elements defining serially connected longitudinal bridge branches connected across the supply terminals, said servomotor (10) being connected in a diagonal across said longitudinal bridge branches;
   each of said semiconductor elements (11, 12, 13, 14) being controlled by connection to an input transistor (21, 22, 23, 24), pairs of said input transistors (21/22; 23/24) being connected to one of two control input terminals (25, 26) to control, when differing signals of a first type are applied to said input terminals, a first semiconductor element (11) in one of said longitudinal bridge branches to become conducting while a second element (12) becomes non-conducting, and a first semiconductor element (13) of the other longitudinal branch to become non-conducting, while the second (14) becomes conducting and causing current to flow through diagonally positioned branches of the bridge, and through said servomotor in a first direction, and when differing signals of a second type are applied to said input terminals current is caused to flow through oppositely diagonally positioned branches of the bridge and through said servomotor in a second direction;
   at least one Zener diode (27, 28) and at least one low-value resistor (29) connected in series with said at least one Zener diode;
   wherein the emitters of one pair (21, 22) of said input transistors are connected to diagonally positioned emitters of the second pair (23, 24) of said input transistors through said at least one low-value resistor;
   and wherein the emitters of one pair of the input transistors are connected to emitters of the corresponding transistors of the second pair (23, 24), and one junction of two emitters of two corresponding transistors (21, 23) is connected to one supply terminal (19) through the at least one Zener diode (27),
   and the other junction of the emitters of two other corresponding input transistors (22, 24) is connected to the other supply terminal (20).

2. Circuit according to claim 1, wherein two Zener diodes (27, 28) are provided, and the other junction of the emitters of two other corresponding input transistors (22, 24) is connected to the other supply terminal (20) through the second Zener diode (28).

3. Circuit according to claim 1 or 2, wherein said at least one low-value resistor (29) forms a common connection between said one junction of two emitters of two corresponding transistors (21, 23) and the other junction of the emitters of two other corresponding input transistors (22, 24).

4. A control circuit for a servomotor (10) including a bridge circuit comprising positive and negative supply terminals (19, 20);
   four semiconductor elements (11, 12, 13, 14), respective pairs (11/12; 13/14) of said semiconductor elements defining serially connected longitudinal bridge branches connected across the supply terminals, said servomotor (10) being connected in a diagonal across said longitudinal bridge branches;
   each of said semiconductor elements (11, 12, 13, 14) being controlled by connection to an input transistor (21, 22, 23, 24), pairs of said input transistors (21/22; 23/24) being connected to one of two control input terminals (25, 26) to control, when differing signals of a first type are applied to said input terminals, a first semiconductor element (11) in one of said longitudinal bridge branches to become conducting while a second element (12) becomes non-conducting, and a first semiconductor element (13) of the other longitudinal branch to become non-conducting, while the second (14) becomes conducting and causing current to flow through diagonally positioned branches of the bridge, and through said servomotor in a first direction, and when differing signals of a second type are applied to said input terminals current is caused to flow through oppositely diagonally positioned branches of the bridge and through said servomotor in a second direction;
   means including a first junction connecting the emitters of one of the input transistors (21, 23) of each of said pairs, and second connection means including a second junction connecting the emitters of the other transistors (22, 24) of said pairs (21, 22; 23, 24);

and series connected resistors (31, 32) connected between said first and second junctions of the joined emitters of the corresponding transistors (21, 23; 22, 24) of said pairs (21, 22; 23, 24);

and voltage supply means (30) at substantially one-half of the voltage level between said positive and negative supply terminals (19, 20) connected to a junction between said series-connected resistors (31, 32).

* * * * *